United States Patent
Yu

(10) Patent No.: US 7,272,413 B2
(45) Date of Patent: Sep. 18, 2007

(54) SYSTEM AND METHOD FOR SUPPORTING MULTIMODE COMMUNICATION IN A MOBILE NETWORK

(75) Inventor: Jae-Wook Yu, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 213 days.

(21) Appl. No.: 10/961,664

(22) Filed: Oct. 8, 2004

(65) Prior Publication Data

US 2005/0079890 A1    Apr. 14, 2005

(30) Foreign Application Priority Data

Oct. 9, 2003    (KR) ...................... 10-2003-0070353

(51) Int. Cl.
*H04M 3/00*    (2006.01)
*H04M 1/00*    (2006.01)

(52) U.S. Cl. .............................. 455/552.1; 455/553.1; 455/418

(58) Field of Classification Search ............. 455/552.1, 455/553.1, 550.1, 73, 418, 419, 432.2, 411, 455/414.1, 414.2
See application file for complete search history.

(56) References Cited

U.S. PATENT DOCUMENTS

| | | | | |
|---|---|---|---|---|
| 5,946,634 | A * | 8/1999 | Korpela | 455/552.1 |
| 6,138,010 | A * | 10/2000 | Rabe et al. | 455/426.1 |
| 6,580,921 | B1 * | 6/2003 | Inoue et al. | 455/552.1 |
| 6,823,196 | B1 * | 11/2004 | Itoh et al. | 455/553.1 |
| 6,990,357 | B2 * | 1/2006 | Ella et al. | 455/553.1 |
| 7,027,833 | B1 * | 4/2006 | Goodman | 455/553.1 |
| 2003/0143988 | A1 * | 7/2003 | Jamadagni | 455/418 |
| 2005/0059427 | A1 * | 3/2005 | Wallace | 455/552.1 |

FOREIGN PATENT DOCUMENTS

| | | |
|---|---|---|
| CN | 1327354 | 12/2001 |
| EP | 1 227 598 A2 | 7/2002 |
| JP | 11-075266 | 3/1999 |
| JP | 11-346383 | 12/1999 |
| JP | 200-196494 | 7/2000 |
| JP | 2001-045566 | 2/2001 |
| JP | 2001-501791 | 2/2001 |
| JP | 2002-051495 | 2/2002 |
| WO | WO99/09721 * | 2/1999 |
| WO | WO 01/77779 A2 | 10/2001 |
| WO | WO 01/88707 A2 | 11/2001 |
| WO | WO 02/23758 A1 | 3/2002 |
| WO | WO 02/43348 A1 | 5/2002 |

OTHER PUBLICATIONS

3GPP: "Mobile Execution Environment (MExE)" 3GPP TS 22.057 V5.0.0, XX, XX, Oct. 1, 2000 (200-10-01), pp. 1-23, XP002302475, Sections 1, 4, 8 & 93.

* cited by examiner

*Primary Examiner*—Sonny Trinh
(74) *Attorney, Agent, or Firm*—Lee, Hong, Degerman, Kang & Schmadeka

(57) ABSTRACT

A mobile communication terminal for supporting a plurality of communication protocols comprises a first software module for managing at least a first operation associated with at least one of the plurality of communication protocols, wherein the first operation is independent of other operations performed by remaining plurality of the communication protocols; and a second hardware module for managing at least a second operation common to at least two of the plurality of communication protocols.

23 Claims, 2 Drawing Sheets

SYSTEM AND METHOD FOR SUPPORTING MULTIMODE COMMUNICATION IN A MOBILE NETWORK

CROSS-REFERENCE TO RELATED APPLICATIONS

Pursuant to 35 U.S.C. § 119(a), this application claims the benefit of earlier filing date and right of priority to Korean Patent Application No. 10-2003-0070353, filed on Oct. 9, 2003, the content of which is hereby incorporated by reference herein in its entirety.

BACKGROUND OF THE INVENTION

1. Field of the Invention

The present invention relates to a mobile communication terminal, and more particularly, to a mobile communication terminal capable of supporting communication over a plurality of wireless communication protocols, such as a GSM/GPRS, a TD-SCDMA, and a WCDMA.

2. Description of the Related Art

A mobile communication terminal is a device for communicating with another party over a wireless communication network. The wireless communication network comprises a mobile switching center in a service region defined by a base station.

Multiple modes of communications (i.e. communication standards/protocols) are available to allow mobile terminals communicate in a mobile communication network. These modes are implemented over communication protocols such as global system for mobile communications (GSM), general packet radio service (GPRS), wideband code division multiple access (WCDMA), and time division-synchronous code division multiple access (TD-SCDMA).

A communication protocol is a standard applicable to the core network's software that is implemented to define a form, a meaning, and a transmission order for messages exchanged in a communications network. The network's software acts as the operating medium that controls message transmission/reception.

Referring to FIG. 1, a block diagram of a mobile communication terminal for supporting multimode communication in accordance with the related art is provided. The mobile communication terminal includes a radio frequency (RF) front-end unit 110, an RF transmission/reception unit 120, an analogue baseband processor 130, a digital baseband processor 140, and a multimedia processor 150.

The RF transmission/reception unit 120 includes a first RF transmission/reception unit 121 for GSM/GPRS communication, and a second RF transmission/reception unit 123 for TD-SCDMA communication. The RF transmission/reception unit 120 may also include a third RF transmission/reception unit 125 for WCDMA communication.

In reception mode, the RF front-end unit 110 separates a signal received by an antenna by way of an RF switch or a duplexer, thereby sending the separated signal to the RF transmission/reception unit 120. In transmission mode, RF front-end unit 110 transmits an RF signal provided by the RF transmission/reception unit 120 to the antenna by way of an RF switch or duplexer.

The RF transmission/reception unit 120 converts a received analogue baseband signal having a comparatively low frequency into a high frequency by a voltage controlled oscillator (VCO) or a frequency mixer. In the transmission mode, RF transmission/reception unit 120 lowers frequency so as to convert a high frequency into an analogue baseband signal.

The analogue baseband processor 130 processes an analogue signal having a low frequency. The digital baseband processor 140 digitalizes an analogue signal processed by the analogue baseband processor 130. The digital baseband processor 140 can be a modem.

Multimedia services require the ability to process large volumes of information at high speed. As shown, the multimedia processor 150 can be an additional processor for processing multimedia music or graphic having a relatively large processing capability.

Since a single modem chip for supporting various standards including a third generation communication method is not developed, the related mobile communication terminal for supporting a multimode has to be provided with a plurality of RF transmission/reception units 121, 123, and 125 for supporting at least the three communication protocols named above.

In the related art mobile communication terminal for supporting multimode communication, a plurality of RF transmission/reception units for supporting the multiple modes are provided. Unfortunately, each time a protocol related standard for one of the terminal's modes of operation is updated, the corresponding hardware or a printed circuit board (PCB) of the mobile communication terminal has to be also updated or completely replaced.

Thus, a method and system is need to overcome the above problem.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a mobile communication terminal capable of supporting multimode communication over a plurality of wireless communication standards is provided. The mobile communication terminal supports multiple communication modes without a hardware change according to a protocol improvement by separating functions of each protocol of a plurality of communication methods and operating a first module for non-common functions among the separated functions and a second module for common functions.

In accordance with one aspect of the invention a mobile communication terminal for supporting a plurality of communication protocols comprises a first module for managing at least a first operation associated with at least one of the plurality of communication protocols, wherein the first operation is independent of other operations performed by remaining plurality of the communication protocols; and a second module for managing at least a second operation common to at least two of the plurality of communication protocols.

The terminal may further comprise a first application programming interface (API) unit for providing an interface between the first and second modules to support at least one of the communication protocols comprising a global system for mobile communications (GSM) protocol, a general packet radio service (GPRS) protocol, a wideband code division multiple access (WCDMA) protocol, and a time division-synchronous code division multiple access (TD-SCDMA) protocol.

In accordance with a preferred embodiment the first module is implemented in software, using a software defined radio (SDR) technique, for example. The second module is implemented in hardware. The first API unit downloads the first operation of at least one of the plurality of communication protocols received by the first module over a wireless network.

The terminal may further comprise a second API unit, and a memory card for controlling functions operated by the first module. The second API unit downloads the first operation of at least one of the plurality of communication protocols stored in a personal computer or the memory card. In accordance with one aspect of the invention, the memory card may comprise a memory stick, a smart media, or a compact flash.

In accordance with yet another embodiment, a method of supporting a plurality of communication protocols for a mobile communication terminal is provided. The method comprises managing at least a first operation associated with at least one of the plurality of communication protocols using a first module of a mobile terminal, wherein the first operation is independent of other operations performed by remaining plurality of the communication protocols; and managing at least a second operation common to at least two of the plurality of communication protocols using a second module of the mobile terminal.

The method further comprises providing an interface between the first and second modules using a first application programming interface (API) unit of the mobile terminal. In this embodiment, the first module is implemented in software, and the second module is implemented in hardware, for example.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Reference will now be made in detail to the preferred embodiments of the present invention, examples of which are illustrated in the above-mentioned drawings.

DETAILED DESCRIPTION OF THE PREFERRED EMBODIMENTS

Figure 1:
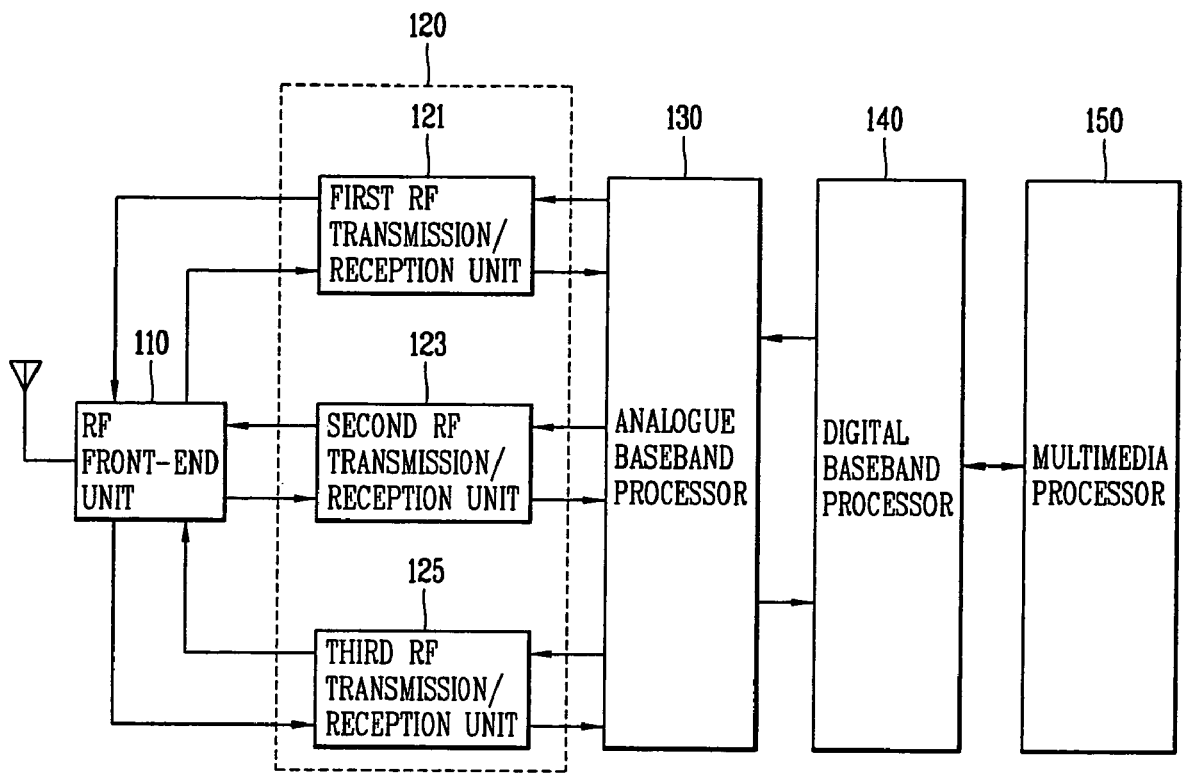
FIG. 1 illustrates a block diagram of a mobile communication terminal for supporting multiple communication modes/protocols in the related art.
Figure 2:
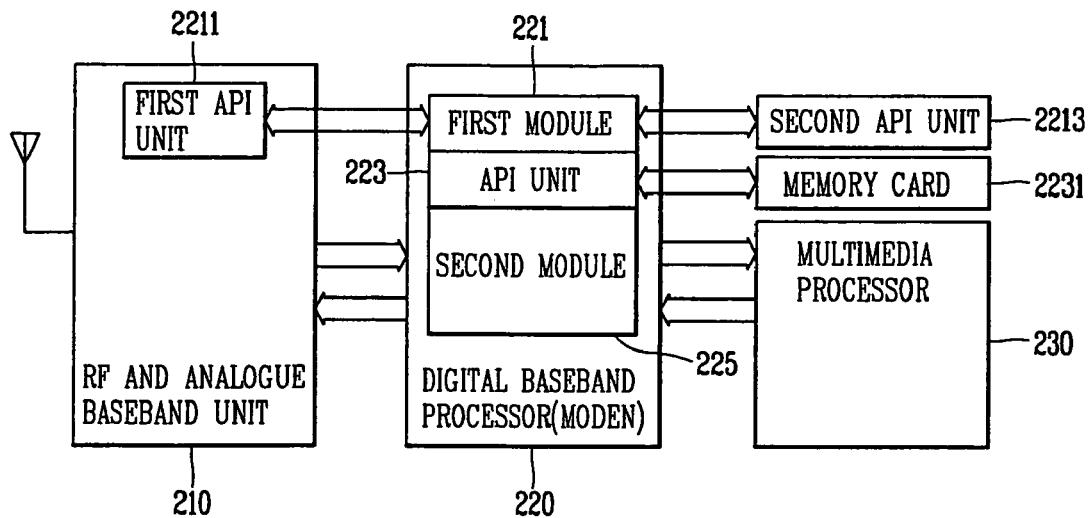
FIG. 2 illustrates a block diagram of a mobile communication terminal for supporting multiple communication modes/protocols in accordance with one embodiment of the present invention.
Figure 3:
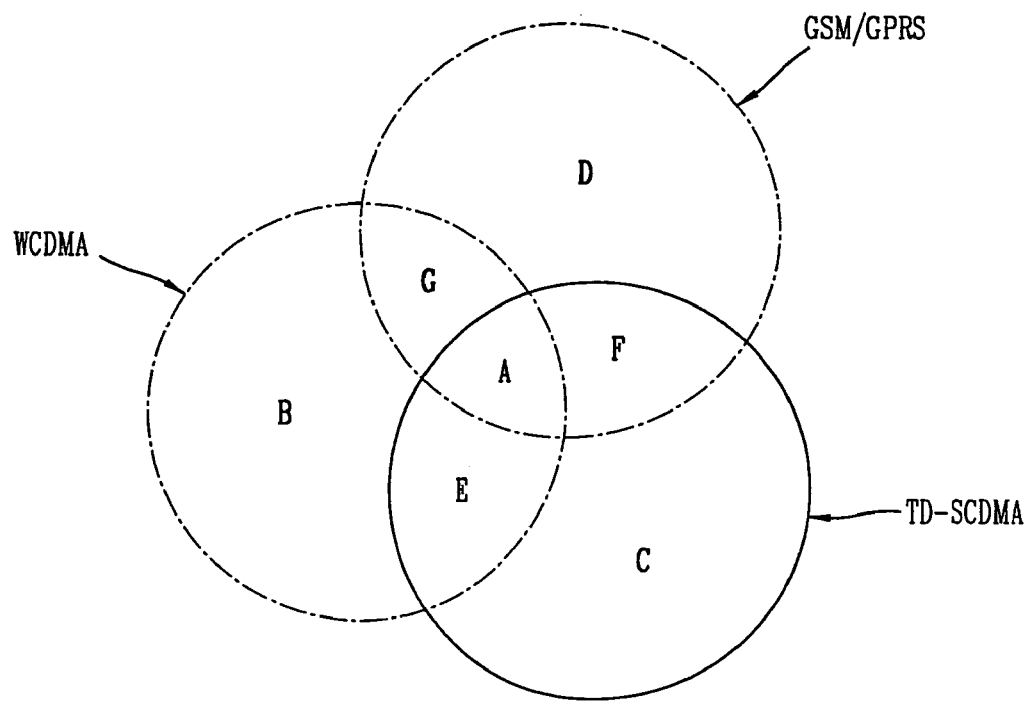
FIG. 3 is a diagram illustrating the operation principle of the mobile communication terminal for supporting multiple communication modes/protocols, according to one embodiment of the present invention.

Referring to FIGS. 2 and 3, a mobile communication terminal for supporting multiple modes without the requirement to change the mobile terminal's hardware is provided. The mobile communication terminal, in a preferred embodiment, supports a plurality of communication protocols, such as GSM/GPRS, WCDMA, and TD-SCDMA. This is accomplished by using a software defined radio (SDR) technique that provides for easily modifying one or more of a network protocol, an operation frequency, a modulation method, a bandwidth, or the like.

Accordingly, instead of a hardware change, the related software program processed by the processor are modified or updated. Thus, in accordance with an exemplary embodiment, the common functions of the respective communication protocols are handled by a hardware implementation, and independent functions of said multiple communication protocols are separately implemented as multiple software modules that perform at least one of the independent functions.

Referring to FIG. 2, the mobile communication terminal for supporting a multimode according to the present invention comprises an RF and analogue baseband unit 210 for receiving a radio frequency signal through an antenna, a digital baseband processor 220 for processing the received RF signal according to a plurality of communication methods, and a multimedia processor 230. The digital baseband processor (e.g., MODEM) 220 comprises a first module 221, a second module 225, an application programming interface (API) unit 223.

The first module 221 is for performing individually operated functions for each of the plurality of communication protocols supported by the mobile communication terminal, for example. The second module 225 is for performing functions commonly operated in each protocol, for example. And, the application programming interface (API) unit 223 is for interfacing the first module and the second module according to the plurality of communication methods, for example.

In accordance with one aspect of the invention, the RF and analogue baseband unit 210 is implemented in hardware, for example, to manage the functions performed by at least one of the RF front-end unit, the RF transmission/reception unit, and the analogue baseband processor. The digital baseband processor 220 comprises a first module 221 for performing functions individually operated in each protocol of a plurality of communication methods, a second module 225 for performing functions commonly operated in each protocol of the plurality of communication methods and an application programming interface (API) unit 223 for interfacing with the first module and the second module according to the plurality of communication methods.

In accordance with another aspect of the invention, the first module 221 is implemented as a hardware modem, and the second module 225 is implemented as a software modem. The API unit 223 may be implemented to provide an interface between hardware or software, or both. The multimedia processor 230 may be dedicated to processing multimedia music or graphics, for example.

Protocols stored in the first module 221 (e.g., a protocol stack and a physical layer) are updated or modified according to a change of a communication method of the mobile communication terminal. A first API unit 2211, a second API unit 2213, and a memory card 2231 may be implemented in a preferred embodiment to download new or improved protocols corresponding to a change in a communication method.

For example, in a preferred embodiment, the first API unit 2211 downloads non-common protocols received through an air interface to the first module 221, and the second API unit 2213 downloads non-common protocols stored in a personal computer (PC) to the first module 221. The API unit 223 downloads non-common protocols stored in the memory card 2231 to the first module 221. The memory card 2231 may comprise at least one of a memory stick, a smart media, and a compact flash, for example.

Referring to FIG. 3, a diagram for illustrating an operation principle of the mobile communication terminal for supporting a multimode according to another embodiment of the invention is provided. As shown, the functions of the various wireless communication protocols may be analyzed and thereby common functions of each protocol may separated from the non-common functions.

In a certain embodiment, the mobile communication terminal comprises a first module for performing the common functions, and a second module for performing the non-common functions. Thus, the mobile communication terminal supports a plurality of communication methods wherein the second module is implemented as a hardware modem and the first module is implemented as a software modem. In an exemplary embodiment of the invention, the common functions among multiple communication protocols, such as GSM/GPRS, TD-SCDMA, and WCDMA, are implemented in form of a hardware modem, and independent functions among the multiple communication protocols are implemented in form of a software modem by using an SDR technique.

The WCDMA method is a third generation standard developed from the GSM method. The TD-SCDMA method is also a third generation standard similar to the GSM method. So the WCDMA method and the TD-SCDMA method have common characteristic related to the CDMA communication technology. Thus, common factors of each method may be processed by a common hardware or software module in accordance with one aspect of the invention.

The region E and A of the WCDMA method and the TD-SCDMA method respectively correspond to a second layer L2 protocol and a third layer L3 protocol, which are almost the same (e.g., by 90%). In case of a multiple access, the WCDMA uses an "FDD+CDMA" method, and the TD-SCDMA uses a "TDD+TDMA+CDMA" method. Accordingly, the region E corresponds to the CDMA, the region B corresponds to the FDD (frequency division duplex), and the region C corresponds to the TDD (time division duplex).

For example, region A represents common functionality of said three GSM/GPRS, TD-SCDMA, and WCDMA. Therefore, region A functions and procedures can be implemented into a single chip solution to include a cyclic redundancy check (CRC), a turbo decoder, and a rake receiver, for example.

Region B represents a unique part of the WCDMA method and comprises the FDD method. Region C represents a unique part of the TD-SCDMA method and comprises a hard handover method, a smart antenna, and a joint detection. Region D represents a unique part of the GSM/GPRS method and comprises a Gaussian-filtered minimum shift keying (GMSK) method.

Region E represents a common function between the TD-SCDMA and the WCDMA and comprises a quadrature phase shift keying (QPSK) method. Region F represents a common function between the GSM/GPRS and the TD-SCDMA and comprises a TDMA method. Region G represents a common function between the GSM/GPRS and the WCDMA and includes a soft handover method.

As such, in the exemplary embodiment of the invention, functions of each layer protocol of the mobile communication terminal for the GSM/GPRS, TD-SCDMA, and WCDMA methods are separated and managed by separate modules where possible. The common modules are implemented by way of an integrated circuit (IC) design or application specific integration-circuits (ASIC) in hardware.

That is, common functions of a hardware including an RF front-end unit and an analogue baseband processor are used as a part of the hardware modem. And, modules that are not commonly used between the multiple protocols are implemented in software. This is because software can be easily upgraded when one of the multiple protocols is updated or modified.

As such, a minimized hardware function is provided to miniaturize the mobile communication terminal's construction, permitting the mobile terminal support multiple communication protocols, such as GSM/GPRS, TD-SCDMA, and WCDMA methods, for example. When a standard or a protocol is updated the respective software of the mobile terminal can be conveniently updated without the requirement for a change in hardware.

Referring to FIG. 3, the case for converting a multimode from the WCDMA method into the TD-SCDMA method will be explained below, in accordance with a preferred embodiment. As shown, the second module has a common function among said GSM/GPRS, TD-SCDMA, and WCDMA methods. As one single chip, a non-common function of the WCDMA method, that is a non-common protocol of the WCDMA method, is downloaded to the first module.

Non-common protocols of the WCDMA, GSM/GPRS and the TD-SCDMA methods are downloaded by one of the first API unit, the second API unit, and the memory card, for example. That is, a non-common protocol of the WCDMA method is downloaded through a wireless network of the conventional WCDMA method by the first API unit, a non-common protocol of the WCDMA method is downloaded through a PC by the second API unit, and a non-common protocol of the WCDMA method is downloaded from the memory card.

When all non-common protocols of the WCDMA method are downloaded to the first module, the API unit interfaces the first and second modules. Accordingly, a common function and a non-common function of the WCDMA method are assembled together by the API unit, so that the mobile communication terminal can smoothly perform all the functions of the WCDMA method.

In case of converting a communication method from the WCDMA method to the TD-SCDMA method, for example, the mobile communication terminal downloads a non-common protocol of the TD-SCDMA method through the first module. The non-common protocol of the TD-SCDMA method is downloaded by at least one of the first API unit, the second API unit, and the memory card.

As the API unit interfaces the second module and the first module, common protocols of the TD-SCDMA method stored in the second module are assembled to non-common protocols of the TD-SCDMA method downloaded to the first module. Accordingly, the mobile communication terminal can smoothly perform all the functions of the TD-SCDMA method.

For the sake of brevity, a method of converting a mode from the WCDMA method to the TD-SCDMA method has been described here. It should be noted, however, any mode change among multiple protocols, such as GSM/GPRS, TD-SCDMA, and WCDMA may be performed in a similar manner.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore all changes and modifications that fall within the metes and bounds of the claims, or equivalents of such metes and bounds are therefore intended to be embraced by the appended claims.

What is claimed is:

1. A mobile communication terminal comprising:
    an RF unit for receiving a radio frequency signal through an antenna, the RF unit comprising an RF application programming interface (RFAPI); and
    a processor in communication with the RF unit via the RFAPI, the processor comprising:
    a first module for performing a first set of operations that are exclusive to at least one communication protocol; and
    a second module for performing a second set of operations that are non-exclusive to at least two communication protocols.

2. The terminal of claim 1 further comprising an application programming interface (API) unit for interfacing the first and second modules.

3. The terminal of claim 1, wherein the communication protocols comprise at least one of global system for mobile communications (GSM)/general packet radio service (GPRS), wideband code division multiple access (WCDMA), and time division-synchronous code division multiple access (TD-SCDMA).

4. The terminal of claim 1, wherein the first set of operations comprises at least one of a gaussian-filtered minimum shift keying (GMSK), a unique function of the GSM/GPRS method.

5. The terminal of claim 1, wherein the first set of operations comprises at least one of a frequency division duplex (FDD), a unique function of the WCDMA method.

6. The terminal of claim 1, wherein the first set of operations comprises at least one of a hard handover, a smart antenna and a joint detection, unique functions of the TD-SCDMA method.

7. The terminal of claim 1, wherein the first set of operations comprises a soft handover that is common with the GSM/GPRS and the WCDMA and is not common with the TD-SCDMA.

8. The terminal of claim 1, wherein the first set of operations comprises a quadrature phase shift keying (QPSK) that is common with the WCDMA and TD-SCDMA and is not common with the GSM/GPRS.

9. The terminal of claim 1, wherein the first set of operations comprises a time division multiple access (TDMA) that is common with the TD-SCDMA and the GSM/GPRS and is not common with the WCDMA.

10. The terminal of claim 1, wherein the second set of operations comprise a cyclic redundancy check (CRC), a turbo decoder and a rake receiver that are common with the GSM/GPRS, the WCDMA, and the TD-SCDMA.

11. The terminal of claim 1, wherein the first module is implemented in software.

12. The terminal of claim 11, wherein the first module is implemented in software defined radio (SDR) technique.

13. The terminal of claim 1, wherein the second module is implemented in hardware.

14. A mobile communication terminal comprising:
    a first module for performing a first set of operations that are exclusive to at least one communication protocol;
    a second module for performing a second set of operations that are non-exclusive to at least two communication protocols protocol;
    an application programming interface (API) unit for interfacing the first and second modules; and
    a first API unit and a second API unit for interfacing communication entities for providing independently operated functions to the first module.

15. The terminal of claim 14, wherein the communication entities comprise at least one of a wireless network, a personal computer, and a memory card.

16. The terminal of claim 15, wherein the first API unit downloads independently operated protocols received through a wireless network to the first module.

17. The terminal of claim 15, wherein the second API unit downloads independently operated protocols stored in a personal computer to the first module.

18. The terminal of claim 15, wherein the API unit downloads independently operated protocols stored in the memory card to the first module.

19. The terminal of claim 18, wherein the memory card is one of a memory stick, a smart media, and a compact flash.

20. A method of supporting a plurality of communication protocols for a mobile communication terminal, the method comprising:
    receiving a communication signal by way of an antenna of the mobile communication terminal;
    providing the communication signal to a processor of the mobile communication terminal, wherein the processor comprises a first module and a second module for processing the received communication signal;
    managing at least a first operation associated with at least one of the plurality of communication protocols using the first module of a mobile terminal, wherein the first operation is exclusive to said at least one of the plurality of the communication protocols; and
    managing at least a second operation common to at least two of the plurality of communication protocols using the second module of the mobile terminal.

21. The method of claim 20 further comprising providing an interface between the first and second modules using a first application programming interface (API) unit of the mobile terminal.

22. The method of claim 20, wherein the first module is implemented in software.

23. The method of claim 20, wherein the second module is implemented in hardware.

* * * * *